(12) United States Patent
Nigro

(10) Patent No.: US 7,739,874 B2
(45) Date of Patent: Jun. 22, 2010

(54) POWER GENERATION

(75) Inventor: Nello Nigro, Burwood (AU)

(73) Assignee: BHP Billiton Innovation Pty. Ltd., Melbourne (AU)

( * ) Notice: Subject to any disclaimer, the term of this patent is extended or adjusted under 35 U.S.C. 154(b) by 174 days.

(21) Appl. No.: 10/574,092

(22) PCT Filed: Sep. 29, 2004

(86) PCT No.: PCT/AU2004/001339

§ 371 (c)(1),
(2), (4) Date: Dec. 1, 2006

(87) PCT Pub. No.: WO2005/031136

PCT Pub. Date: Apr. 7, 2005

(65) Prior Publication Data

US 2007/0084209 A1     Apr. 19, 2007

(30) Foreign Application Priority Data

Sep. 30, 2003     (AU)     ............................... 2003905325

(51) Int. Cl.
*F02C 6/18*     (2006.01)
*F02C 3/26*     (2006.01)

(52) U.S. Cl. ..................... 60/780; 60/39.464
(58) Field of Classification Search ............. 60/39.01, 60/39.52, 774, 775, 780–784, 39.182, 39.464, 60/39.465, 39.461, 39.5, 772
See application file for complete search history.

(56) References Cited

U.S. PATENT DOCUMENTS

| | | | |
|---|---|---|---|
| 4,353,214 A * | 10/1982 | Gardner ....................... | 60/652 |
| 4,488,398 A | 12/1984 | Noguchi | |
| 5,509,264 A | 4/1996 | Ito et al. | |
| 5,724,805 A * | 3/1998 | Golomb et al. ............... | 60/783 |
| 5,979,183 A | 11/1999 | Smith et al. | |
| 6,148,602 A * | 11/2000 | Demetri ....................... | 60/775 |
| 6,170,264 B1 | 1/2001 | Viteri et al. | |
| 6,622,470 B2 | 9/2003 | Viteri et al. | |

(Continued)

FOREIGN PATENT DOCUMENTS

CA     2465384 A1 *     5/2003

(Continued)

OTHER PUBLICATIONS

International Search Report for PCT WO 2005/031136 published Nov. 18, 2004.

(Continued)

*Primary Examiner*—Michael Cuff
*Assistant Examiner*—Gerald L Sung
(74) *Attorney, Agent, or Firm*—Brinks Hofer Gilson & Lione; G. Peter Nichols

(57) ABSTRACT

The combustor (5) of a gas turbine (7) is supplied with coal bed methane (51), oxygen (53) and a part of the flue gas (55), predominantly $CO_2$, produced from the gas turbine (7) and sent through a heat recovery steam generator (27), all under pressure. The heat recovery steam generator (27) receives the hot flue gas and generates steam (57) for driving a steam turbine (29). The other part of the flue gas stream that passes through the heat recovery steam generator (27) is supplied to a suitable underground storage region (3).

10 Claims, 1 Drawing Sheet

U.S. PATENT DOCUMENTS

2003/0131582 A1* 7/2003 Anderson et al. .......... 60/39.55
2005/0011179 A1* 1/2005 Ooka et al. .............. 60/39.182

FOREIGN PATENT DOCUMENTS

EP 0 831 205 A2 3/1998

OTHER PUBLICATIONS

Written Opinion for PCT WO 2005/031136 published Nov. 23, 2004.
International Preliminary Report on Patentability for PCT WO 2005/031136 published Feb. 7, 2006.

* cited by examiner

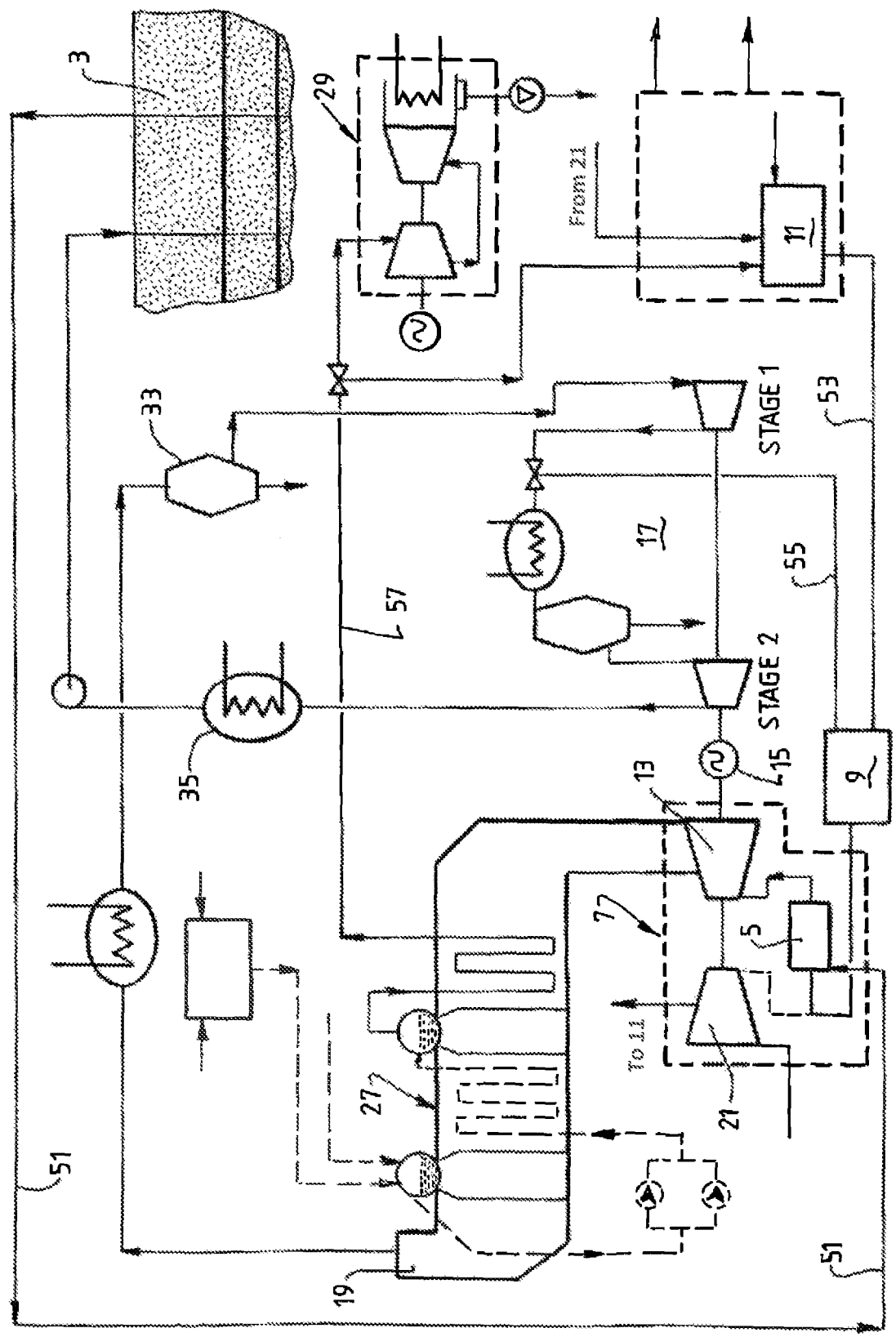

POWER GENERATION

This application is the national phase entry of PCT/AU2004/001339 published in English on Apr. 7, 2005 as WO 2005/031136 and which claims priority to AU 2003905325 filed Sep. 30, 2003, the entire contents of each is incorporated herein by reference.

The present invention relates to a method and an apparatus for generating electrical power that is based on the use of coal bed methane gas as a source of energy for driving a gas turbine and a steam turbine for generating the power.

The term "coal bed methane" is understood herein to mean gas that contains at least 75% methane gas on a volume basis obtained from an underground coal source.

According to the present invention there is provided a method of generating power via a gas turbine and a steam turbine which comprises:
(a) supplying coal bed methane, an oxygen-containing gas, and flue gas produced in the gas turbine, all under pressure, to a combustor of the gas turbine and combusting the coal bed methane and using the heated combustion products and the flue gas to drive the gas turbine;
(b) supplying a hot flue gas stream produced in the gas turbine to a heat recovery steam generator and using the heat of the flue gas to generate steam by way of heat exchange with water supplied to the steam generator;
(c) supplying steam from the steam generator to a steam turbine and using the steam to drive the steam turbine; and
(d) supplying (i) a part of the flue gas stream from the gas turbine that passes through the heat recovery steam generator to the combustor of the gas turbine and (ii) another part of the flue gas stream from the gas turbine that passes through the heat recovery steam generator to a suitable underground storage region.

One of the features of the method and the apparatus of the present invention is that it can operate with no $CO_2$ emissions into the atmosphere.

By way of example, supplying all of the flue gas, which inevitably contains substantial amounts of $CO_2$, that is not supplied to the combustor of the gas turbine to the suitable underground storage is an effective option for preventing $CO_2$ emissions into the atmosphere that does not have any adverse environmental consequences.

Another feature of the present invention is that the use of part of the flue gas stream from the gas turbine in the combustor of the gas turbine makes it possible to reduce, and preferably replace altogether, the use of air in the combustor of the gas turbine. The total replacement of air with oxygen and flue gas, which is predominantly $CO_2$ in this mode of operation, overcomes significant issues in relation to the use of air. For example, the use of air means that the flue gas stream from the gas turbine contains a significant amount (typically at least 70 vol. %) nitrogen, an amount (typically 10 vol. %) oxygen, and an amount (typically 5-10 vol. %) $CO_2$. The mixture of nitrogen, oxygen, and $CO_2$ presents significant gas separation issues in order to process the flue gas stream properly. The replacement of air with oxygen and flue gas means that the flue gas stream from the heat recovery steam generator is predominantly $CO_2$ and water and greatly simplifies the processing requirements for the flue gas from the gas turbine, with the result that it is a comparatively straightforward exercise to produce a predominately $CO_2$ flue gas stream and supply the stream to the combustor of the gas turbine.

Preferably the oxygen-containing gas supplied to the combustor of the gas turbine is oxygen.

Preferably the flue gas stream supplied to the combustor of the gas turbine is predominantly $CO_2$.

Preferably step (d) includes supplying part of the flue gas stream to the combustor of the gas turbine and the remainder of the flue gas stream to the underground storage.

Preferably step (d) includes supplying the flue gas stream to the underground storage region as a liquid phase.

Preferably the underground storage region is a coal bed seam.

More preferably the underground storage region is the coal bed seam from which coal bed methane to power the gas turbine is extracted. In this context, the existing well structures for extracting coal bed methane can be used to transfer flue gas, in liquid or gas phases, to the underground storage region.

Preferably step (d) includes supplying the flue gas stream to the underground storage region via existing well structures for extracting coal bed methane from the underground storage region.

Preferably step (d) includes separating water from the flue gas.

Step (d) may further include:
(i) compressing the flue gas stream to a first pressure (typically 20-30 bar); and
(ii) supplying one part of the compressed flue gas stream to the combustor of the gas turbine.

Step (d) may further include:
(i) compressing another part of the compressed flue gas stream to a second, higher pressure (typically at least 70 bar, more typically at least 73 bar);
(ii) cooling the pressurised flue gas stream from step (i) and forming a liquid phase; and
(iii) supplying the liquid phase to the underground storage region.

According to the present invention there is also provided an apparatus for generating power via a gas turbine and a steam turbine which comprises:
(a) a gas turbine;
(b) a means for supplying coal bed methane, an oxygen-containing gas, and flue gas produced in the gas turbine, all under pressure, to a combustor of the gas turbine for combusting the coal bed methane and using the heated combustion products and the flue gas to drive the gas turbine;
(c) a heat recovery steam generator for generating steam from water supplied to the steam generator by way of heat exchange with a flue gas from the gas turbine;
(d) a steam turbine adapted to be driven by steam generated in the steam generator;
(e) a means for supplying (i) one part of a flue gas stream from the gas turbine that passes through the heat recovery steam generator to the combustor of the gas turbine and (ii) another part of the flue gas stream from the gas turbine that passes through the heat recovery steam generator to a suitable underground storage region.

Preferably the means for supplying one part of the flue gas stream to the combustor of the gas turbine and another part of the flue gas stream to the suitable underground storage region includes a means for converting the flue gas from a gas phase into a liquid phase to be supplied to the suitable underground storage region.

In a situation in which the oxygen-containing gas for the combustor of the gas turbine includes oxygen, preferably the apparatus further includes an oxygen plant for producing oxygen.

The present invention is described further with reference to the accompanying drawing which is one, although not the only, embodiment of a power generation method and apparatus of the invention.

With reference to the figure, the method includes supplying the following gas streams to a combustor 5 of a gas turbine generally identified by the numeral 7:

(a) coal bed methane from an underground source 3 via a dedicated coal bed methane compressor station (not shown) and a supply line 51;

(b) oxygen, in an amount required for stoichiometric combustion, produced in an oxygen plant in the form of an air separation plant 11, via a line 53;

(c) flue gas, which is predominantly $CO_2$, that has been supplied from a flue gas stream from the turbine 7, described hereinafter, via a line 55.

The streams of oxygen and flue gas are pre-mixed in a mixer 9 upstream of the combustor 5.

The streams of coal bed methane and oxygen/flue gas are supplied to the combustor 5 at a preselected pressure of between 16 and 28 bar. It is noted that the combustor may operate with any suitable pressure.

The coal bed methane is combusted in the combustor 5 and the products of combustion and the flue gas are delivered to an expander 13 of the turbine 7 and drive the turbine blades (not shown) located in the expander 13.

The output of the turbine 7 is connected to and drives an electrical generator 15 and a multiple stage flue gas compressor train 17.

When the power generation method is operating in this mode, air in the air compressor 21 of the turbine 7 is bled at approximately 5 bar pressure and delivered to the air separation plant and is used to produce oxygen for the combustor 5 of the gas turbine 7.

The output gas stream, ie the flue gas, from the turbine 7 is at atmospheric pressure and typically at a temperature of the order of 540° C.

The flue gas from the turbine 7 is passed through a heat recovery steam generator 27 and is used as a heat source for producing high pressure steam, typically approximately 75 bar or 7.5 Mpa, from demineralised water and condensate return supplied to the steam generator 27.

The high pressure steam is supplied via a line 57 to a steam turbogenerator 29 and is used to run the turbogenerator 29 and generate electrical power.

The flue gas from the heat recovery steam generator 27, which is predominantly $CO_2$ and water, leaves the steam generator as a wet flue gas stream, typically at a temperature of 125° C., via an outlet 19.

The wet flue gas is then passed through a water separator 33 that separates water from the stream and produces a dry flue gas stream.

The dry flue gas stream is then passed through the multiple stage flue gas compressor train 17.

In a first stage of compression the flue gas is compressed to the necessary pressure, namely 22 bar in the present instance, for the combustor 5 of the turbine 7.

Compressed flue gas from the exit of the first stage is supplied to the combustor 5 of the turbine 7 via the mixer 9, typically a mix valve, and mixes with oxygen from the air separator 11 prior to being supplied to the combustor 5.

The remainder of the flue gas is supplied to the second compression stage, marked "Stage 2" in the figure, and is compressed to a high pressure, typically above 73 bar, and the stream of compressed flue gas is then passed through a condenser 35. The condenser 35 cools the temperature of the flue gas stream to below 31° C. and thereby converts the flue gas to a liquid phase.

The liquid flue gas stream leaving the condenser is pressurised (if necessary) and then injected into existing field wells.

When the power generation system is not operating in the above-described mode and, more particularly is not receiving the stream of pre-mixed oxygen and flue gas, the turbine 7 operates on a conventional basis with air being drawn through the turbine air intake (not shown) and compressed in the air compressor 21 and thereafter delivered to the combustor 5 and mixed with coal bed methane and the mixture combusted in the combustor 5.

More particularly, the option of operating on a more conventional basis is available by disconnecting the multiple stage flue gas compressor train 17 from the turbine 7.

The key components of the above-described embodiment of the process and the apparatus of the invention shown in the figure are as follows:

(a) Air Separation Plant—This unit is required to produce oxygen for combustion of coal bed methane in the turbine combustor. Typically, the plant is a standard off-the-shelf unit sized to cope with the $O_2$ required for complete combustion of coal bed methane.

(b) Gas Turbine/Generator—Typically, this unit is a standard gas turbine fitted with a standard combustor. The multi-stage flue gas compressor will be fitted on the same shaft with a clutch unit that will enable the compressor to be isolated when the turbine is operating in a conventional manner. The attachment of large multi-stage compressors to gas turbine units is quite common in the steel industry where low Btu steelworks gases are compressed by these units before being delivered to the combustor for combustion.

(c) Heat Recovery Steam Generator—Typically, this unit is a standard double pressure unfired unit.

(d) Steam Turbine/Generator—Typically, this unit, complete with the steam cycle ancillaries, is a standard steam turbine unit.

(e) Flue Gas Recirculating and $CO_2$ Underground storage System—Typically, this system contains the following:

(i) Water Separator/knockout Unit—Typically this unit is a simple water separation plant in which water is knocked out of the flue gas stream prior it entering the multi-stage compressor unit.

(ii) $CO_2$ Multi-stage Compressor Train—For the embodiment shown in FIG. 1, typically this unit is designed to handle the entire flue gas stream in the first stage of compression and the smaller stream of flue gas for underground storage. This smaller stream will be pressurised to above 73 bar before being delivered to the condenser.

(iii) Condenser—This unit is required to produce liquid flue gas, which is predominantly $CO_2$, prior to injecting it to underground wells.

Many modifications may be made to the embodiments of the present invention described above without departing from the spirit and scope of the invention.

By way of example, in another, although not the only other possible, embodiment of the method and the apparatus of the invention, the flue gas from the steam generator 27 is passed through a recuperator and is cooled to a temperature, typically 80 C, before being transferred to the water separator 33. In addition, the dry flue gas is not split into two streams after the first stage in the multiple stage flue gas compressor train 17, as is the case in the embodiment shown in the figure. Rather, the whole of the dry flue gas from the water separator 33 is compressed in the compressor train 17 and then passed through the condenser 35. The liquid stream from the condenser 35 is then split into two streams, with one stream being supplied to the underground storage region and the other stream being passed through the recuperator 31 and being converted into a gas phase via heat exchange with the flue gas stream from the steam generator 27. The reformed flue gas from the recuperator 31 is then supplied to the combustor 5 via the mixer 9.

The claims defining the invention are as follows:

1. A method of generating power via a gas turbine and a steam turbine in alternative exclusive modes which comprises:
   A. operating in a first mode by:
      a. supplying (i) coal bed methane, (ii) oxygen derived from an air separation plant with air supplied to the air separation plant being air from an air compressor of the gas turbine, and (iii) flue gas produced in the gas turbine wherein the flue gas is predominantly $CO_2$, all under pressure, to a combustor of the gas turbine and combusting the coal bed methane to generate first heated combustion products and using the first heated combustion products and the flue gas to drive the gas turbine;
      b. supplying a hot flue gas stream produced in the gas turbine to a heat recovery steam generator and using the heat of the flue gas to generate steam by way of heat exchange with water supplied to the steam generator;
      c. supplying steam from the steam generator to a steam turbine and using the steam to drive the steam turbine; and
      d. compressing flue gas that passes through the heat recovery steam generator in a flue gas compression train and supplying (i) a part of the compressed flue gas stream to the combustor of the gas turbine and (ii) the remainder of the compressed flue gas stream to a suitable underground storage region; and
   B. operating in a second mode by:
      a. disconnecting the flue gas compression train and supplying coal bed methane and air from the air compressor of the gas turbine, both under pressure, to a combustor of the gas turbine and combusting the coal bed methane to generate second heated combustion products and a flue gas and using the second heated combustion products and the flue gas to drive the gas turbine;
      b. supplying a hot flue gas stream produced in the gas turbine to a heat recovery steam generator and using the heat of the flue gas to generate steam by way of heat exchange with water supplied to the steam generator;
      c. supplying steam from the steam generator to a steam turbine and using the steam to drive the steam turbine;
   wherein when power is not generated using the first mode, power is generated using the second mode and wherein when power is not generated using the second mode, power is generated using the first mode.

2. The method defined in claim 1 wherein step (d) of operating mode (A) includes supplying the flue gas stream to the underground storage region as a liquid phase.

3. The method defined in claim 1 wherein the underground storage region is a coal bed seam.

4. The method defined in claim 3 wherein the underground storage region is the coal bed seam from which coal bed methane to power the gas turbine is extracted.

5. The method defined in claim 4 wherein step (d) includes supplying the flue gas stream to the underground storage region via existing well structures for extracting coal bed methane from the underground storage region.

6. The method defined in claim 1 wherein step (d) of operating mode (A) includes separating water from the flue gas.

7. The method defined in claim 1 wherein step (d) of operating mode (A) further includes:
   i. compressing the remainder of the compressed flue gas stream to a second, higher pressure;
   ii. cooling the second, higher pressurised flue gas stream from step (i) and forming a liquid phase; and
   iii. supplying the liquid phase to the underground storage region.

8. The method defined in claim 1 includes supplying air from the air compressor of the gas turbine and producing oxygen in the plant during operating mode A.

9. The method defined in claim 1 wherein the flue gas compression train is fitted on the same shaft as the gas turbine.

10. The method defined in claim 9 wherein when the gas turbine and steam turbine are operating in the second mode, the flue gas compression train is rotationally isolated from the gas turbine.

* * * * *